United States Patent
Matsuo et al.

(10) Patent No.: US 6,853,904 B2
(45) Date of Patent: Feb. 8, 2005

(54) NAVIGATION SYSTEM

(75) Inventors: Shigeru Matsuo, Hitachinaka (JP);
Katsuaki Tanaka, Hitachi (JP);
Kimiyoshi Machii, Hitachi (JP);
Yoshinori Endo, Mito (JP)

(73) Assignees: Hitachi, Ltd., Tokyo (JP); HCX Corporation, Toda (JP)

( * ) Notice: Subject to any disclaimer, the term of this patent is extended or adjusted under 35 U.S.C. 154(b) by 22 days.

(21) Appl. No.: 10/367,733

(22) Filed: Feb. 19, 2003

(65) Prior Publication Data

US 2003/0158651 A1 Aug. 21, 2003

(30) Foreign Application Priority Data

Feb. 19, 2002 (JP) ........................................ 2002-041778

(51) Int. Cl.[7] .............................................. G01C 21/00
(52) U.S. Cl. ......................... 701/200; 701/211; 701/28; 340/990; 340/995.11; 340/995.14; 345/1.1; 345/716; 345/850; 345/156; 73/178 R
(58) Field of Search ................................ 701/200, 211, 701/1, 28, 36; 73/178 R; 340/990, 995.11, 995.14; 345/1.1, 716, 850, 156

(56) References Cited

U.S. PATENT DOCUMENTS 5,339,392 A * 8/1994 Risberg et al. ............. 345/762
2002/0187837 A1 * 12/2002 Hasebe et al. ................ 463/43

* cited by examiner

*Primary Examiner*—Olga Hernandez
(74) *Attorney, Agent, or Firm*—Crowell & Moring LLP

(57) ABSTRACT

In a navigation system, display screen handling PG 2032 prepares hierarchically a plurality of operation screens to receive the setting from the operator, and changes the operation screen displayed on display 208 according to the content of the operation to operation button group 207 by the operator, the operation screen under the display, and said layered structure. Further, communication control PG 2032 controls cellular phone 30 through cellular phone IF 204 when it is necessary to receive the information from the information service center 10 in order to process according to the setting given by the operator through each of a series of operation screens displayed on display 208, and establishes the communication line between information service center 10 and this system. And, after information is received, the communication line is cut off.

14 Claims, 11 Drawing Sheets

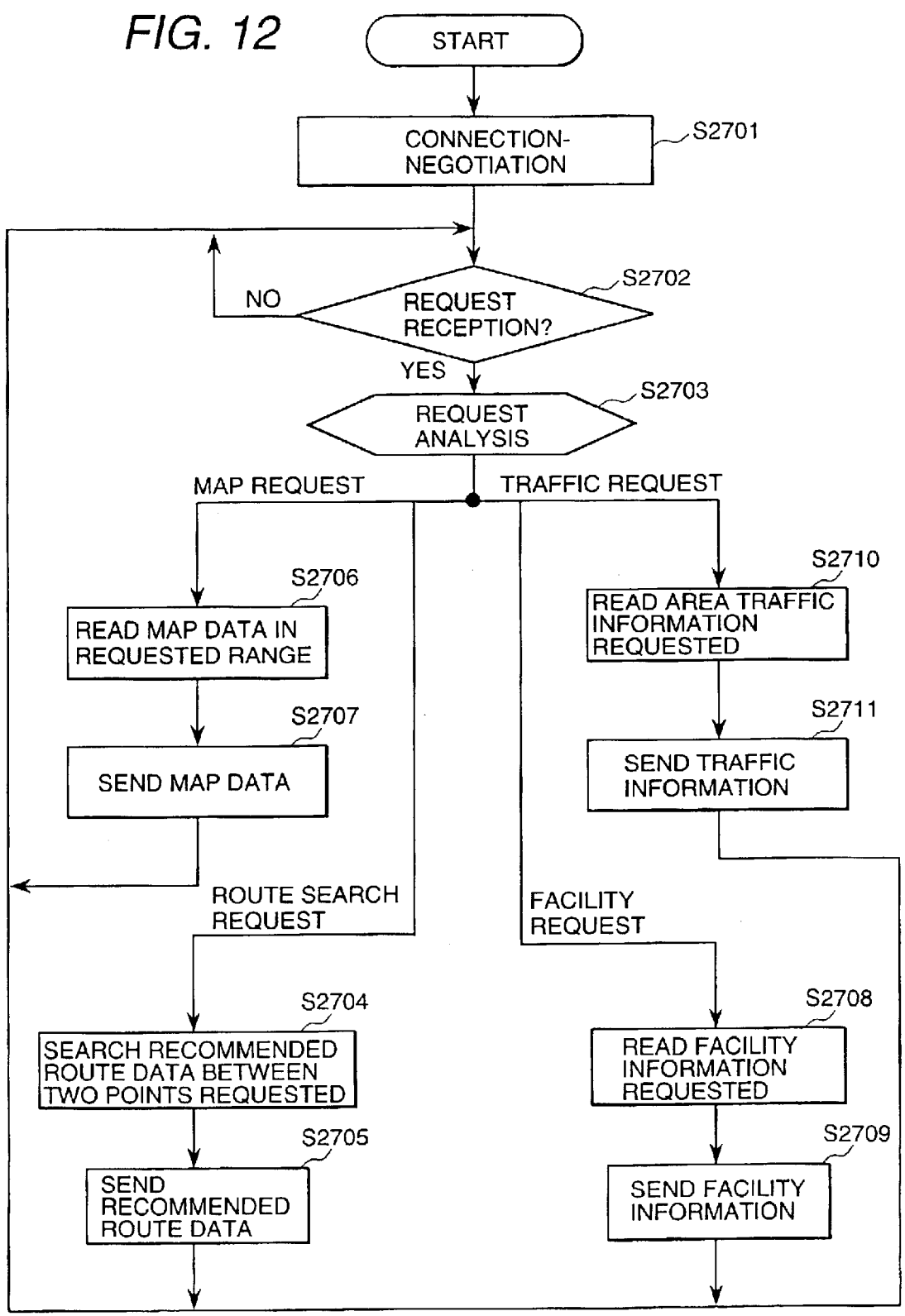

NAVIGATION SYSTEM

BACKGROUND OF THE INVENTION

The present invention relates to a navigation system which has communication function with the information service device such as a communication type navigation device.

A communication type navigation device is proposed, in which various information on route information and map information, etc. acquired by accessing the information service device by using the radio communication device such as cellular phones can be provided to a user.

When the public line is used to communicate with the information service device, connection fees are generated in such a communication type navigation device. Here, connection fees increase as the time that the communication line has been established between the information service device and this system becomes long when public line adopts the hourly charge system.

Further, because the acceptable size of the main body of the device is limited from the relation of the installation place, etc., the size of the display panel of the navigation device is also limited in general. For instance, when the display part is integrated with the main body of the device, and the size of the entire navigation device is assumed the same 1DIN (Deutsches Institut fuer Normung) as a general car stereo, the display screen becomes a small, wide screen of about 4.2 inches. Therefore, the mechanism to improve the usability in the setting or the operation is required in order to accept the setting necessary to display the route guidance and the map, etc. from the operator through the operation screen displayed on this small, wide screen.

SUMMARY OF THE INVENTION

The present invention is achieved in consideration of the above-mentioned circumstances.

An object of the present invention is to provide a car navigation system having the communication function with the information service device such as the communication type navigation devices, which can shorten the establishment time of the communication line between the information service device and the this car navigation.

Another object is to improve the usability in the setting or the operation required.

To solve the above-mentioned problems, a car navigation system according to the present invention includes a communication part which communicates through a communication line, a display part, a plurality of screen switch buttons, and a processing part which accepts setting from an operator and performs the processing. Further, said processing part includes a screen change processing means and a communication control processing means.

Said screen change processing means allows the operation screen displayed in said display part to change according to the content of the operation on said plural screen switch buttons by the operator, the operation screen under the display, and the layered structure of said plural operation screens, the operation screens to receive the setting from the operator being provided hierarchically.

Further, a communication control processing means establishes communication line between said information service device and this system by controlling said communication part when it is necessary to receive the information from said information service device in order to process according to the setting given by the operator through each of a series of operation screens displayed in said display part, and cuts off said communication line after said information is received.

By adopting the above configuration according to the present invention, the communication line is established between the information service device and this system to perform the processing (for instance, the display of the map in the vicinity of the point set by the user and the route guidance to the destination set by the user) according to the setting given by the operator, only when it is necessary to receive the information (for instance, the map information used for map display and the route information used to guide the route) from the information service device. Further, when the reception of the information ends, the communication line is cut off. Therefore, the communication line can be prevented from coming to remain being established with the communication not actually done. As a result, the establishment time of the communication line between the information service device and this system can be shortened.

According to the present invention, a plurality of operation screens is prepared hierarchically to receive the setting content from the operator. Thereby, the operation screen displayed in said display part is changed according to the content of the operation on said plural screen switch buttons by the operator, the operation screen under the display, and the layered structure of said plural operation screens. Because each operation screen can be simply composed by adopting such configuration, the usability in the setting or the operation can be improved even when the display screen of said display part is made as a small, wide screen of about 4.2 inches for instance.

BRIEF DESCRIPTION OF DRAWINGS

FIG. 12 is a flow chart explaining the operation of information service center 10 shown in FIG. 10.

DETAILED DESCRIPTION OF THE PREFERRED EMBODIMENTS

The embodiment of the present invention will be explained hereinafter.

Figure 1:
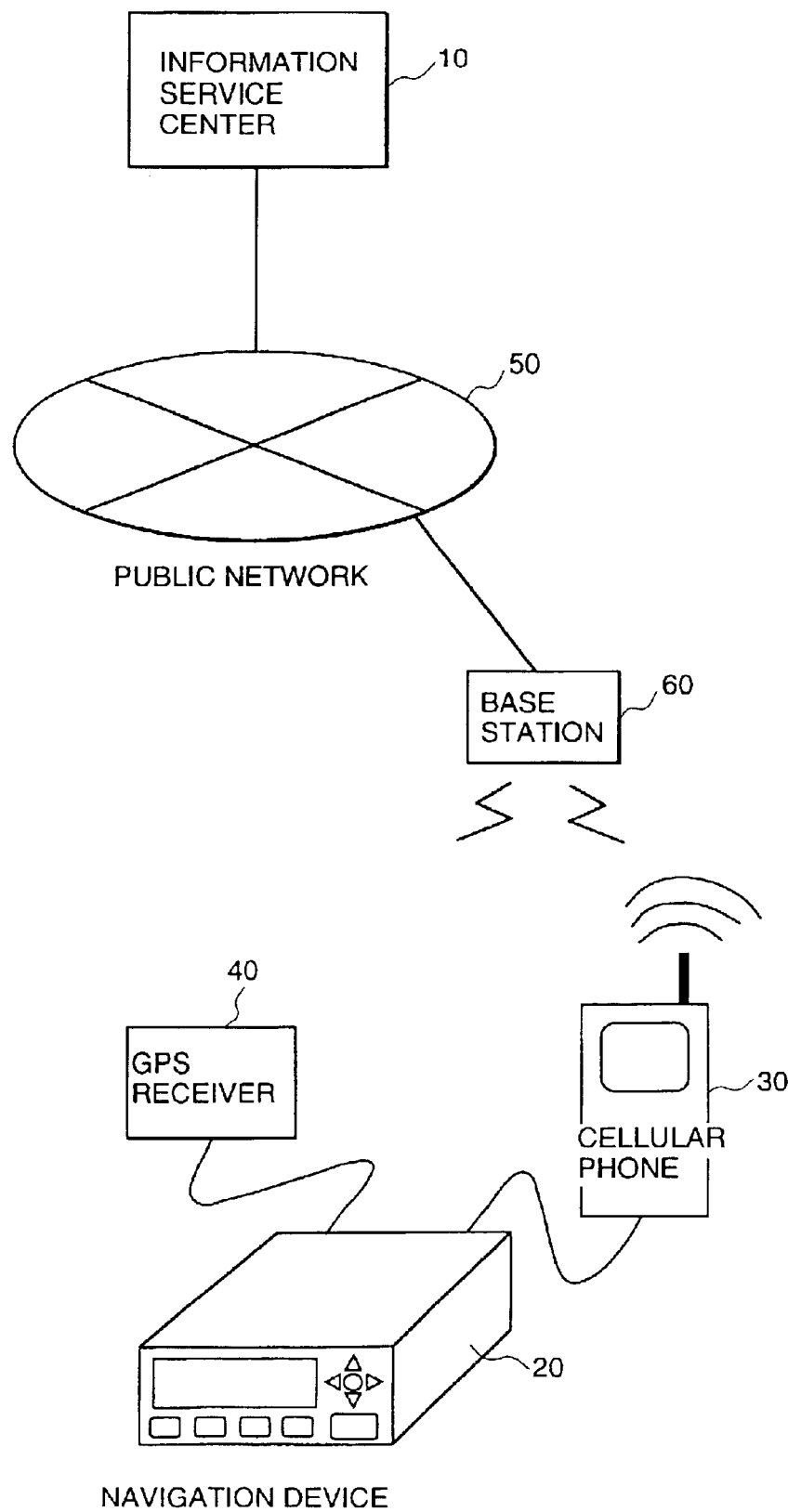
FIG. 1 is a schematic diagram of the communication system according to an embodiment of the present invention.

FIG. 1 is an outline view of the communication system to which one embodiment of the present invention is applied.

The communication system in this embodiment comprises navigation device 20 installed and used in a vehicle, and information service center 10 to provide various data such as map data, route data, and traffic data, etc. to the navigation device 20 as shown in the figure.

Here, navigation device 20 is composed so as to connect with cellular phone 30. The navigation device 20 communicates with information service center 10 through this cellular phone 30, wireless base station 60, and public line network 50.

Further, the navigation device 20 is composed so that various sensors installed in the vehicle such as GPS receiver 40, and speed sensors and the giro sensors not shown in the figure can be connected.

Navigation device 20 in the above communication system has a plurality of operation screens provided hierarchically, for receiving the setting (for instance, the destination setting of the route guidance and the point setting of the map display) from the operator. Further, a plurality of screen switch buttons has been also installed therein.

The operation screen displayed in said display part is changed according to the content of the operation on said plural screen switch buttons by the operator, the operation screen under the display, and the layered structure of said plural operation screens.

When the setting necessary to execute the function provided by navigation device 20 (for instance, route guidance and/or map display) is given from the operator through such an operation screen, the navigation device 20 executes its function according to this setting. The navigation device 20 controls cellular phone 30 only when it is necessary to receive the information (for instance, route information used for the route guidance and/or map information used for the map display) from the information service center 10, establishes the communication line between information service center 10 and this system, and receives the information. And, when the reception of information ends, the communication line is cut off at once.

On the other hand, information service center 10 performs the necessary processing (for instance, route search processing or information retrieval processing) according to the information request from the navigation device 20, obtains the information, and sends it to navigation device 20.

Next, navigation device 20 and information service center 10 which compose the above-mentioned communication system will be explained.

First of all, navigation device 20 will be explained.

Figure 2:
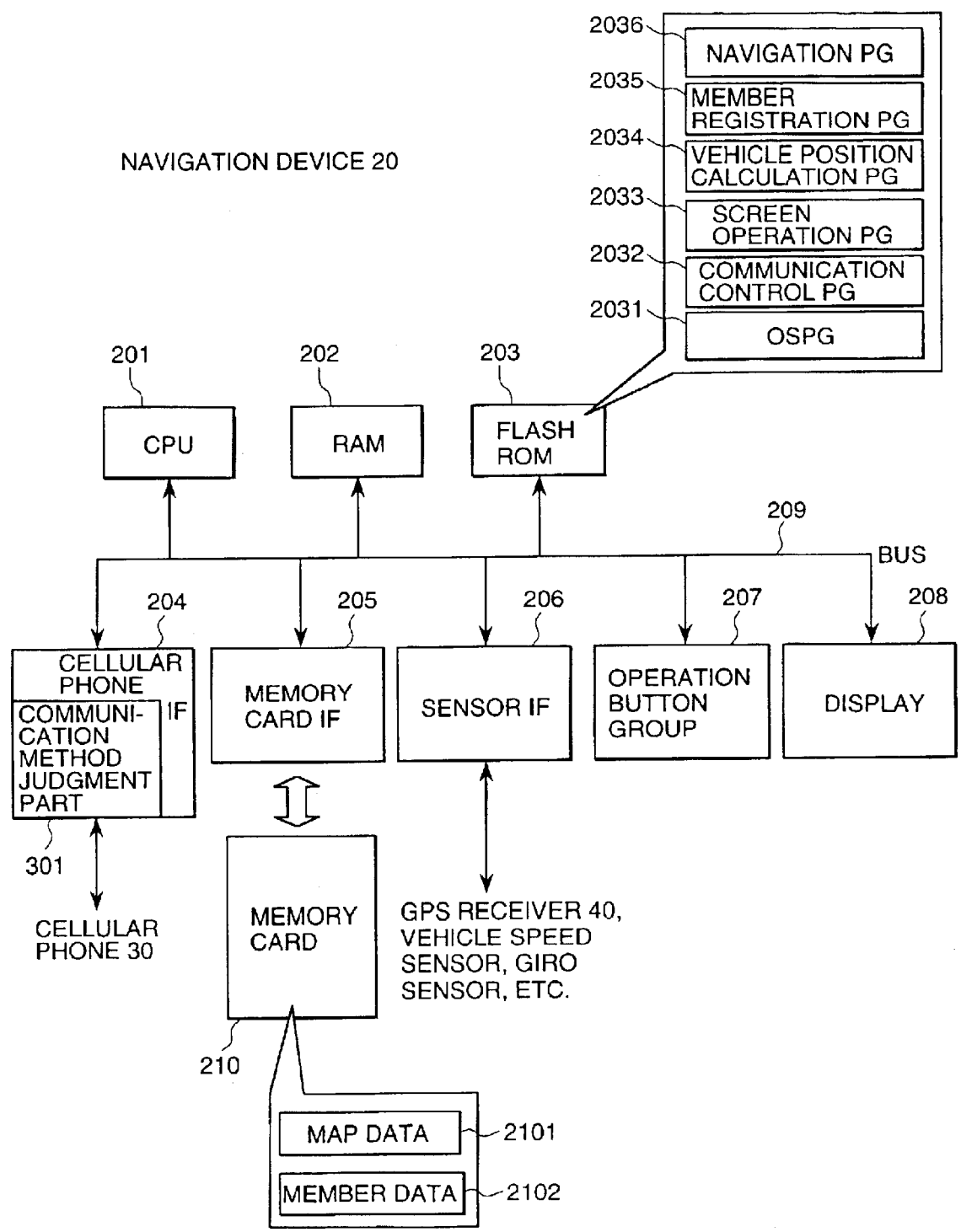
FIG. 2 is a block diagram of navigation device 20 shown in FIG. 1.

FIG. 2 is a block diagram of navigation device 20.

Navigation device 20 comprises CPU 201, RAM 202 which functions as a work area of CPU 201, flash ROM 203 where various programs to achieve the functions given by navigation device 20 are stored, cellular phone IF (interface) 204 to connect with cellular phone 30, memory card IF 205 to connect with memory card (a hard disk of the card type is included) 204 used to preserve various data such as map data 2101, member data 2102, etc., sensor IF 206 to connect with various sensors such as GPS receiver 40, a speed sensor, and a giro sensor, operation button group 207, display 208, and bus 209 to connect these each part 201–208 mutually.

Here, cellular phone IF 204 has communication method judgment part 301 for determining whether the communication method of cellular phone 30 is a circuit switching method or a packet communication method.

Map data 2101 registered on memory card 210 is map data for a large area (zoom-out) map and map data for a detailed (zoom-in) map. In the map data for the large area map, data on the whole country is registered beforehand. On the other hand, because the map data for a detailed map is map data received from the information service center 10, data on the whole country is not necessarily completed.

OSPG (operation system program) 2031, communication control PG 2032, display screen handling PG 2033, vehicle position calculation PG 2034, and member registration PG 2035 are stored in flash ROM 203. Further, navigation PG 2036 is stored as application PG to achieve each of the functions that the user can provide navigation device 20.

OSPG 2031 is program which is loaded into RAM 202 first when a power supply of navigation device 20 is turned on, and executed by CPU 201. OSPG 2031 controls totally each of parts 201-208 shown in FIG. 2.

Communication controls PG 2032 is a program that establishes the communication line between information service center 10 and this system by controlling cellular phone IF 204 according to the instruction from OSPG 2031, and cuts off the established communication line.

Display screen handling PG2033 is a program that accepts various setting from the operator by displaying the operation screens on display 208. In this embodiment, a plurality of operation screens which have the layered structure are prepared, and various setting is accepted through these operation screens.

Vehicle position calculation PG 2034 is a program that calculates the position (present place) of the vehicle equipped with navigation device 20 based on the measurement data obtained from GPS receiver 40 connected with sensor IF 206, the speed sensor, and the giro sensor, etc.

Member registration PG 2035 is a program that saves member data 2102 which is a qualification necessary to receive information from the information service center 10.

Navigation PG 2036 is a program that performs various processing which relates to navigations such as the route guidance, the map display, and the traffic information display, etc.

PG 2032–2036 other than OSPG 2031 are called by OSPG 2031, loaded into RAM 202, and executed by CPU 201.

In navigation device 20 according to this embodiment, display 208 has been integrated with the main body of navigation device 20. The size of the main body of navigation device 20 is same 1DIN as a general car stereo.

Figure 3:
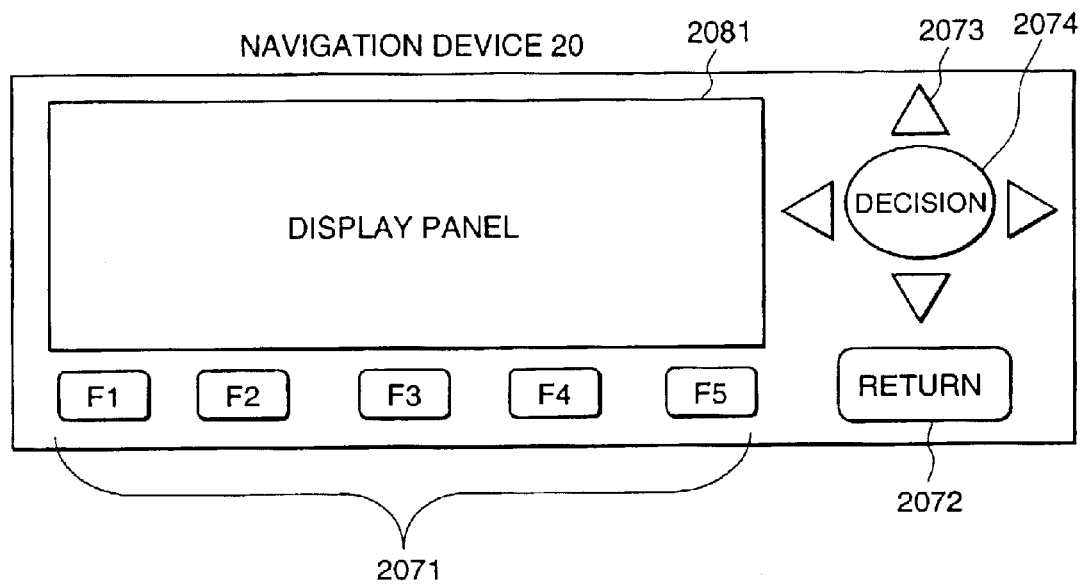
FIG. 3 shows examples of operation button group 207 and display 208 arranged in front of navigation device 20 shown in FIG. 2.

One example of operation button group 207 arranged in front of navigation device 20 and display 208 is shown in FIG. 3. Here, display panel 2081 on display 208 has a wide screen of about 4.2 inches as can be installed in front of the main body of the device of 1DIN size.

Buttons F1–F4 arranged downward in front of the main body are used as screen switch buttons 2071. When screen switch button 2071 is handled, OSPG 2031 notifies display screen handling PG 2032 of the handling operation. Display screen handling PG 2032 switches the operation screen displayed on display panel 2081, based on the operated screen switch button 2071, and the operation screen currently displayed on display panel 2081 and the hierarchical structure of the operation screen.

Figure 4:
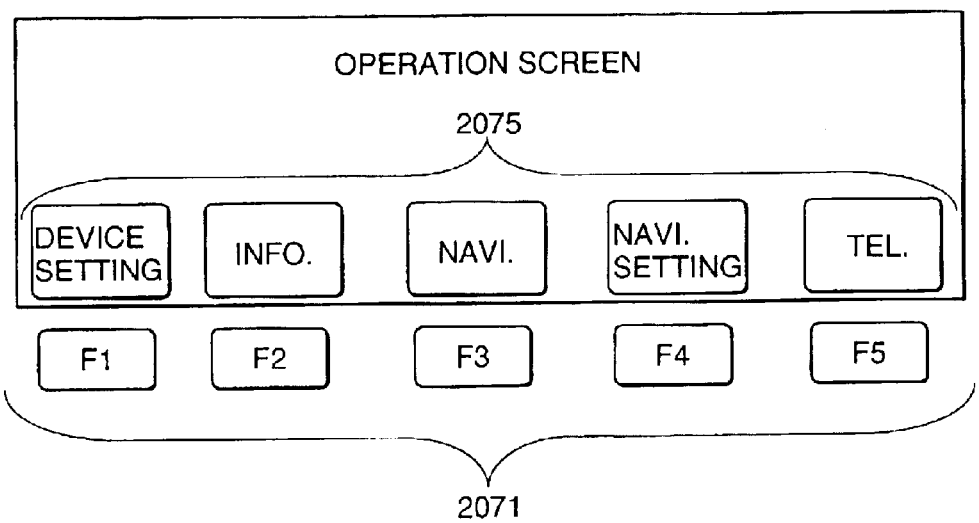
FIG. 4 is an illustration showing the relation between item information 2075 displayed on display panel 2081 of navigation device 20 shown in FIG. 2 and screen switch button 2071(F1–F5).

One example of the operation screen is shown in FIG. 4. Display screen handling PG 2032 displays explanation information 2075 corresponding to respective screen switch buttons 2071 under the operation screen under the operation screen as shown in the figure. Explanation information 2075 is information on the explanation of the set item which can be accepted through the operation screen switched and displayed on display panel 2081 by operating corresponding screen switch button 2071. The operator can easily understand which screen switch button 2071 has to be operated so as to allow the screen to change to the operation screen required to set desired information by referring to this explanation information 2075. When the state that all the screen switch buttons 2071 are not operated continues longer than the predetermined time, screen handling PG 2032 does not display explanation information 2075 until any one of the screen switch buttons 2071 is operated by the operator afterwards.

Further, returning to FIG. 3, return button 2072 arranged in the lower right part in front of the main body is a button for switching the operation screen displayed on display panel 2081 to the previous operation screen. When return button 2072 is operated, the OSPG 2031 notifies the operation of there turn button to display screen handling PG 2032. At this time, display screen handling PG 2032 switches the current operation screen to the operation screen displayed on display panel 2081 just before the current one.

Cross button 2073 and decision button 2074 arranged in the upper right part in front of the main body are buttons to move the cursor displayed on display panel 2081, and to select the item. OSPG 2031 moves the cursor on display panel 2081 20 according to the operation to cross button 2073. When decision button 2074 is operated, OSPG 2031 notifies the cursor position of that time to PG 2035–2037 under operation when information is displayed in display part 208. PG 2035–2037 under operation processes according to the item to which the notified cursor position indicates.

Next, the operation of the above navigation device 20 will be explained.

As mentioned above, CPU 201 loads OSPG 2031 into RAM 202 and executes it when the power supply of navigation device 20 is turned on. OSPG 2031 loads other various PG 2032–2036 into RAM 202 and executes them.

In the following, the process achieved by executing communication control PG 2032 will be referred as a communication control module, the process achieved by executing display screen handling PG 2033 as a display screen handling module, the process achieved by executing vehicle position calculation PG 2034 as a vehicle position calculation module, the process achieved by executing member registration PG 2035 as a member registration module, and the process achieved by executing navigation PG 2036 as a navigation module.

FIGS. 5 to 8 are views explaining the screen change of the operation screen displayed on display panel 2081.

First of all, the operation when the communication method which uses cellular phone 30 is a circuit switching method will be explained by using FIG. 5. The communication method which adopts cellular phone 30 as mentioned above is judged by communication method judgment part 301 of cellular phone IF 30.

(A-1) Screen 0

Display screen handling module displays screen 0 which is the initial operation screen on display panel 2081. The screen 0 includes "DEVICE SETTING" (button F1) for shifting to the operation screen to adjust voice and picture quality, etc., "INFO." (button F2) for shifting to the operation screen to retrieve information at information service center 10, "NAVI." (button F3) for shifting to the operation screen for route guidance, "NAVI. SETTING" (button F4) for shifting to the operation screen to do various setting of registration of member information etc., and "TEL." (button F5) for shifting to the operation screen to set by cellular phone 30, as explanation information 2075 on buttons F1–F5 which are screen switch buttons 2071

(A-2) Screen 2

When button F3 is operated with screen 0 displayed on display panel 2081, the display screen handling module detects this operation. And, the module shifts the screen displayed on display panel 2081 from screen 0 to screen 2 which is the operation screen to do setting necessary to guide the route. At this time, the display screen handling module confirms whether memory card 210 is installed on memory IF 205, and whether installed memory card 210 can be used for navigation device 20. The display screen shifts to screen 1 to display the error message without shifting to screen 2 when there is a problem, and the display screen returns to screen 0 after screen 1 is displayed on display panel 2081 for the predetermined time.

The screen 2 includes "NAVI. SETTING" (button F1), "INFO." (button F2), "YOU ARE HERE" (button F3) to shift to the operation screen for displaying the map near the present placer, "MAP OPERATION" (button F4) to shift to the operation screen for changing the setting (zoom-in and zoom-out, etc.) of the map displayed on display panel 2081, and "DEST. SETTING" (button F5) to shift to the operation screen for setting the destination (goal) of the route guidance as well as the map, as explanation information 2075 on buttons F1–F5.

In the screen 2, the map displayed with explanation information 2075 is a map that the navigation module displays on display panel 2081 by using map data 101, for instance, stored in memory card 210. You can use the defaulted map (map in the vicinity of the fixed registration point and/or the map near the present place) as the map, or the map displayed on display panel 2081 at the end before that (Which map is displayed at the end may be cached in memory card 210).

Further, "NAVI. SETTING" and "INFO." which are explanation information associated with button F1 and F2 in screen 2 are similar to "NAVI. SETTING" and "INFO." which are explanation information associated with button F4 and F2 in screen 0. Therefore, the display screen handling module shifts the content of the display of display panel 2081 from screen 2 to screen 4 when button F1 is operated on screen 2, and shifts that of display panel 2081 from screen 2 to screen 3 when button F2 is operated.

(A-3) Screen 2-1

When button F5 is operated with screen 2 displayed on display panel 2081, the display screen handling module detects this operation. Then, the display screen handling module shifts the screen displayed on display panel 2081 to screen 2-1 which is the operation screen to accept the destination setting. Screen 2-1 includes: "POI" (button F1) to shift to the operation screen for setting destination from facilities name etc.; "PREVIOUS DESTINATION" (button F2) to shift to the operation screen for setting destination from the career of the destination set in the past; "MEMORY" (button F3) to shift to the operation screen for setting destination from registered place; "HOME" (button F4) to shift to the operation screen for setting own house in the destination; and "TEL. NUM." (button F5) to shift to operation screen for setting destination from the telephone number as explanation information 2075 on button F1–F5.

Figure 6:
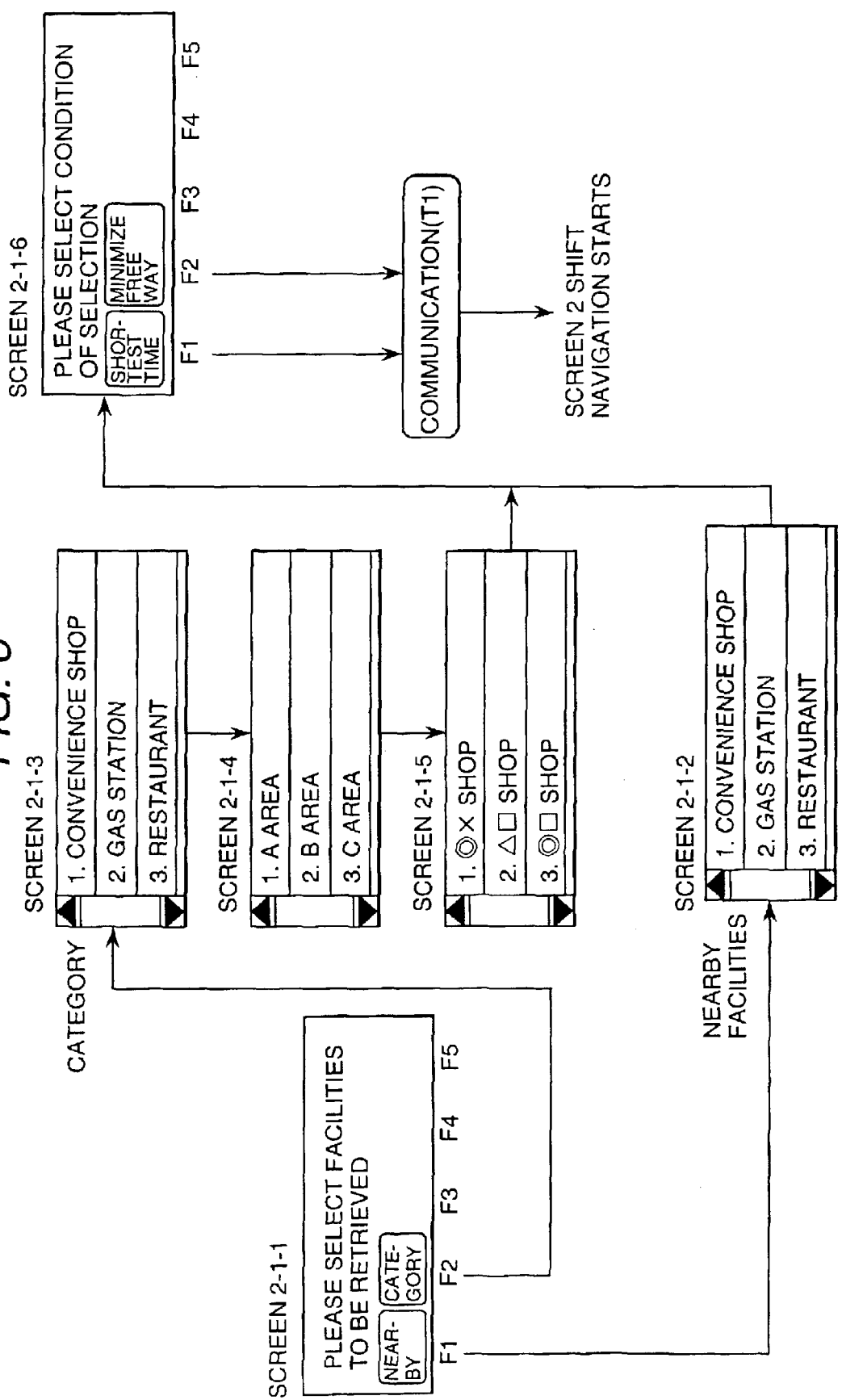
FIG. 6 is an illustration showing the screen change of operation screen displayed on display panel 2081 of FIG. 4.

The operation when button F1 is operated with the screen 2-1 displayed will be explained with reference to FIG. 6.

Further, the operation when buttons F2–F5 are operated will be explained with reference to FIG. 7.

(A-4) Screen 2-2

When button F4 is operated with screen 2 displayed on display panel 2081, the display screen handling module detects this operation. Then, the display screen handling module shifts the screen displayed on display panel 2081 to screen 2-2 which is the operation screen to accept the setting of the map operation. Screen 2-2 includes "NORTH" (button F1), "PRESENT PLACE(YOU ARE HERE)" (button F2), "DETAILS (ZOOM-IN)" (button F3), and "LARGE AREA (ZOOM-OUT)" (button F4), along with the map as explanation information 2075 on button F1–F4.

Here, "PRESENT PLACE" which is explanation information 2075 associated with button F2 is similar to "PRESENT PLACE" which is explanation information 2075 associated with button F3 on screen 2. Therefore, when button F2 is operated on screen 2-2, the display screen handling module shifts the content of the display of display panel 2081 from screen 2-2 to screen 2-3.

When button F1 is operated with screen 2-2 displayed on display panel 2081, the display screen handling module notifies a "NORTH" instruction of the navigation module. Then, the navigation module changes the north direction of the map displaying in display panel 2081 so as to turn to a predetermined direction of display panel 2081(for instance, upper part). Further, when button F3 is operated, the instruction of "DETAILS" is notified the navigation module. When received, the navigation module makes the map displayed on display panel 2081 by using the map data for the detailed map registered on memory card 210. In addition, the navigation module notifies the instruction of "LARGE AREA" when button F4 is operated. Then, the navigation module makes the map displayed on display panel 2081 by using the map data for the large area map registered on memory card 210.

When button F3 is operated and the map data on the detailed map which tries to be displayed is not registered on memory card 210, the navigation module requests the reception of the detailed map data to the communication control module. When requested, the communication control module establishes the communication line between information service center 10 and this system, downloads the map data for the detailed map requested from the navigation module, and registers this on memory card 210. And, when the downloading ends, the communication line is cut off automatically.

(A-5) Screen 2-3

When button F3 is operated with screen 2 displayed on display panel 2081, display screen handling module detects this operation. Then, the screen displayed on display panel 2081 is shifted from screen 2 to screen 2-3 which is the operation screen for displaying the map in the neighborhood of the present place.

Screen 2-3 includes "MAP OPERATION" (button F1), "DESTINATION SETTING" (button 2), "INFO." (button F3), and "NAVI. SETTING" (button F4) along with the map in the neighborhood of the present place as explanation information 2075 on buttons F1–F4.

Here, "MAP OPERATION" and "DESTINATION SETTING" which are explanation information 2075 associated with button F1 and F2 are similar to those which are explanation information 2075 associated with buttons F4 and F5 on screen 2. Therefore, when button F1 is operated on screen 2-3, the display screen handling module shifts the content of the display on display panel 2081 from screen 2-3 to screen 2-2. When button F2 is operated, the content of the display on display panel 2081 is shifted from screen 2-3 to screen 2-1. Further, "INFO." and "NAVI. SETTING" which are explanation information 2075 associated with buttons F3 and F4 are similar to "NAVI. SETTING" and "INFO." which are explanation information 2075 associated with button F4 and F2 on screen 0. Therefore, the display screen handling module shifts the content of the display on display panel 2081 from screen 2-3 to screen 4 when button F3 is operated on screen 2-3. And, it shifts the content of the display on display panel 2081 from screen 2-3 to screen 3 when button F4 is operated.

With regard to screen 2-3, the navigation module makes the map in the neighborhood of the present place displayed along with explanation information 2075 by using the present place calculated by the vehicle position calculation module and the map data registered on memory card 210, and displays in display panel 2081. Whether the map displayed on display panel 2081 is the detailed map or the large area map is determined according to the content of the setting accepted from the operator through the operation screen (screen 2-2) for the map operation. However, when map data in the neighborhood of the present place is not registered on memory card 210 though the content of the setting is the detailed map, the map in the neighborhood of the present place is displayed by using the map data for the large area map.

(A-6) Screen 3

When button F2 is operated with screen 0 displayed on display panel 2081, the display screen handling module detects this operation. And, the screen displayed on display panel 2081 is shifted from screen 0 to screen 3 which is the operation screen to shift to operation screen for retrieving the information given by information service center 10.

Screen 3 includes "MAP RENEWAL" (button F1) to shift to the operation screen for updating the map, "LANDMARK" (button F2) to shift to the operation screen for receiving information on local facilities, "TRAFFIC INFO." (button F3) to shift to the operation screen for receiving on the traffic information as explanation information 2075 on buttons F1–F3.

Well, the display screen handling module notifies the navigation module of the instruction of "MAP RENEWAL" when button F1 is operated with screen 3 displayed on display panel 2081. When received, the navigation module requests the reception of the map data displaying in display panel 2081 to the communication control module. When received, the communication control module establishes the communication line between information service center 10 and this system, downloads the map data requested from the navigation module, and updates the corresponding map data registered on memory card 210 to this downloaded map. And, when the downloading ends, the communication line is cut off automatically. When the map is not displayed on display panel 2081, the navigation module can display the selection screen on display panel 2081 so that the operator can select the map data to be updated among the corresponding map data registered on memory card 210.

Further, the display screen handling module notifies the navigation module of the instruction of "LANDMARK" when button F2 is operated with screen 3 displayed on display panel 2081. When received, the navigation module requests the reception of the facilities information in the neighborhood of the present place to the communication control module. The communication control module establishes the communication line between information service center 10 and this system, downloads the information of facilities in the neighborhood of the present place requested from the navigation module, and registers it on memory card 210. And, when the downloading ends, the communication line is cut off automatically. After that, the navigation module displays the map in the neighborhood the present place on display panel 2081 with the information of facilities in the neighborhood of the present place by using the map data stored on memory card 210 and the downloaded information of facilities.

Further, the display screen handling module notifies the navigation module of the instruction of "TRAFFIC INFORMATION" when button F3 is operated with screen 3 displayed on display panel 2081. When received, the navigation module requests the reception of the traffic information in the neighborhood of the present place calculated by the vehicle position calculation module to the communication control module. The communication control module establishes the communication line between information service center 10 and this system, downloads the traffic information in the neighborhood of the present place requested from the navigation module, and registers it on memory card 210. And, when the downloading ends, the communication line is cut off automatically. After that, the navigation module displays the map in the neighborhood the present place on display panel 2081 with the traffic information in the neighborhood of the present place by using the map data stored on memory card 210 and the downloaded traffic information.

(A-7) Screen 4

When button F4 is operated with screen 0 displayed on display panel 2081, display screen handling module detects this operation. And, the screen displayed on display panel 2081 is shifted from screen 0 to screen 4 which is the operation screen for doing various setting of the registration of member information etc. At this time, whether memory card 210 is installed on memory IF 205, and the installed memory card 210 is available to navigation device 20, etc. are confirmed by the display screen handling module. And, the screen shifts to screen 1 to display the error message without shifting to screen 4 when there is a problem. The screen returns to screen 0 after screen 1 is displayed on display panel 2081 for the predetermined time.

Screen 4 includes "ICONS" (button F1) for setting the type of facilities to display icon on map, "TRACKING" (button F2) for setting whether making the running tracks for the vehicle displayed, "MEMBER SETTING" (button F3) for setting member information to receive the information service from information service center 10 as explanation information 2075 on button F1–F3. The operation when various setting is done by using this screen 4 will be explained later.

Figure 5:
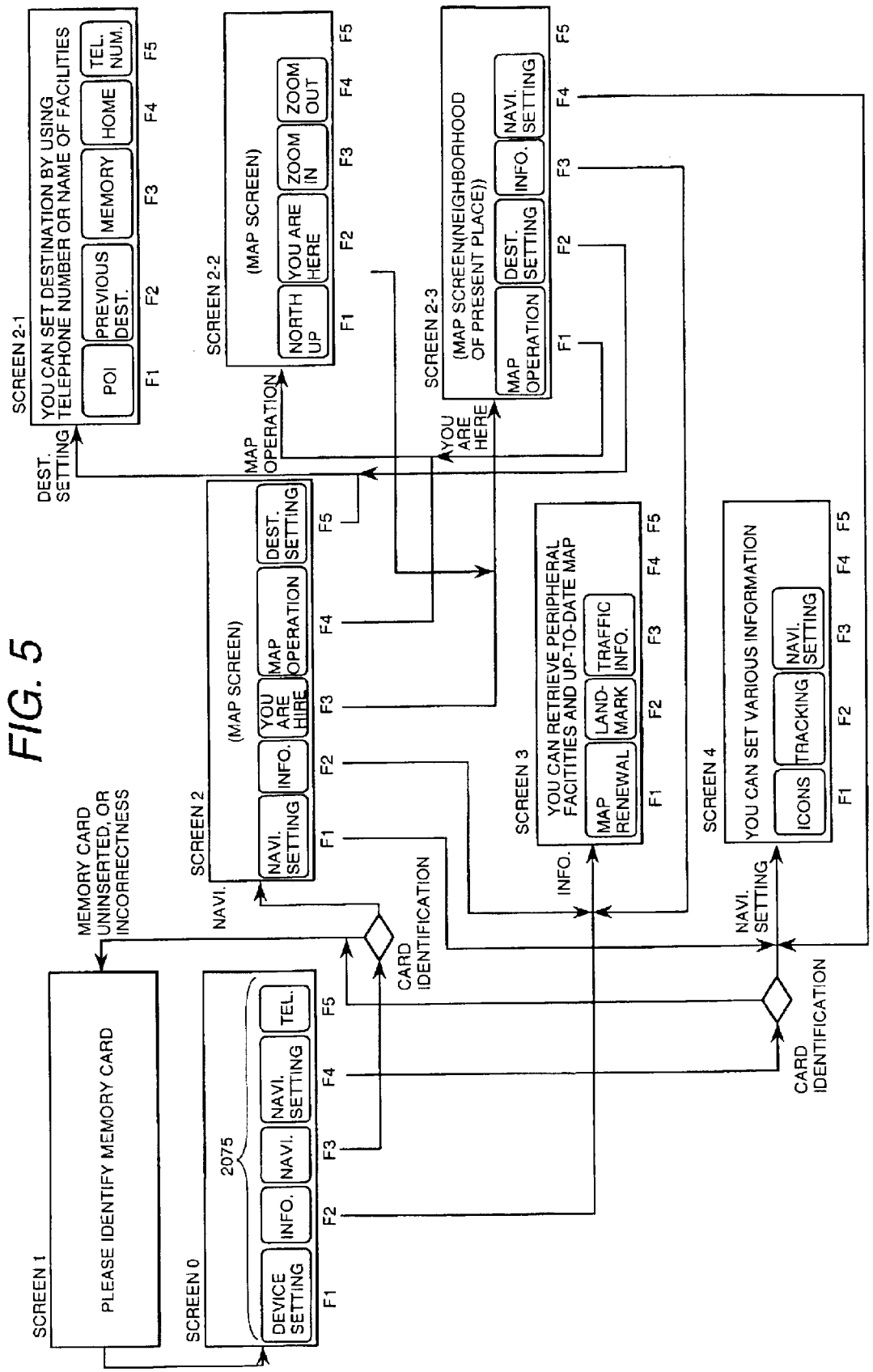
FIG. 5 is an illustration showing the screen change of operation screen displayed on display panel 2081 of FIG. 4.

When return button 2072 is operated on each of the screens shown in FIG. 5, the display screen handling module detects this operation, and returns the screen displayed on display panel 2081 to the previous screen.

Next, the operation when button F1 is operated with screen 2-1 displayed will be explained with reference to FIG. 6.

(B-1) Screen 2-1-1
When button F1 is operated with screen 2-1 displayed on display panel 2081, the display screen handling module detects this operation. As a result, the screen which is the operation screen for selecting whether making the facility set as the destination the nearest facility or making the facility the whole country facilities is displayed on displays screen 2-1-1. Screen 2-1-1 includes "NEARBY" (button F1) to set the nearest facility as the destination and "CATEGORY" (button F2) to set the destination from facilities in the whole country as explanation information 2075 on buttons F1 and F2.

(B-2) Screen 2-1-2

When button F1 is operated with screen 2-1-1 displayed on display panel 2081, the display screen handling module detects this operation, and makes display panel 2081 to display screen 2-1-2 which is the operation screen to select the type of nearest facility set as the destination. The operator can select the desired type by using cross key 2073 and decision button 2074 from among the facility type displayed on screen 2-1-2. And, when the desired type is selected, the display screen handling module sets the facility of the selected type and the facility nearest to the present place calculated from the vehicle calculation module as the destination. After that, it makes display panel 2081 to display screen 2-1-6 which is the operation screen to select the condition (toll road priority or ordinary road priority) used to search for a recommended route.

(B-3) Screen 2-1-3
When button F2 is operated with screen 2-1-1 displayed on display panel 2081, the display screen handling module detects this operation, and makes display panel 2081 to display screen 2-1-3 which is the operation screen to select the type of the facility, etc. set as the destination. The operator can select the desired type by using cross key 2073 and decision button 2074 from among the facility type displayed on screen 2-1-3. And, when the desired type is selected. And, when the desired type is selected, screen 2-1-4 which is the operation screen to select the existence area of the destination is displayed on display panel 2081.

(B-4) Screen 2-1-4

The operator can select the desired area from among the area displayed on screen 2-1-4 by using cross key 2073 and decision button 2074. And, when the desired area is selected, the display screen handling module retrieves information such as facilities which exist in this area and facilities which belongs to the type selected through screen 2-1-3 displayed immediately before in display panel 2081 by using the map data registered on memory card 210. And, screen 2-1-5 which is operation screen to select the desired facilities etc. from among information on the detected facilities, etc. is displayed.

(B-5) Screen 2-1-5

The operator can select the desired facility from among facilities displayed on screen 2-1-4 by using cross key 2073 and decision button 2074. And, when the desired facility are selected, the display screen handling module sets this facility as the destination. After that, screen 2-1-6 is displayed on display panel 2081.

(B-6) Screen 2-1-6

When button F1 is operated with screen 2-1-6 displayed on display panel 2081, the display screen handling module requests the route guidance to the destination set by using display screen immediately before to the navigation module under the condition of the priority use of the toll road. On the other hand, when button F2 is operated, the display screen handling module requests the route guidance to the destination set to the navigation module under the condition of the priority use of the ordinary road.

When received, the navigation module requests the reception of the recommended route from the present place to the destination set which the vehicle calculation module calculates and the recommended route under the priority use for the toll road or the ordinary road to the communication control module. The communication control module establishes the communication line between information service center 10 and this system, downloads the route data of the recommended route requested the reception from the navigation module and the detailed map data in the neighborhood of the destination, and registers it on memory card 210. And, when the downloading ends, the communication line is cut off automatically. After that, the navigation module displays the map in the neighborhood of the present place on display panel 2081 with the traffic information in the neighborhood of the present place by using the map data stored on memory card 210 and the downloaded route data, and starts the route guidance.

Next, the operation when buttons F2–F5 are operated with screen 2-1 displayed will be explained with reference to FIG. 7.

(C-1) Screen 2-1-7

When button F2 is operated with screen 2-1 displayed on display panel 2081, the display screen handling module detects this operation, and makes display panel 2081 to display screen 2-1-7 which is the operation screen to select this destination from among the list of the facilities, etc. set as the destination so far recorded as the past record in memory card 210. The operator can select the desired facility from among the facilities, etc. displayed on screen 2-1-7 by using cross key 2073 and decision button 2074. And, when the desired facility are selected, the display screen handling module sets this facility as the destination. After that, screen 2-1-6 is displayed on display panel 2081.

(C-2) Screen 2-1-8

When button F3 is operated with screen 2-1 displayed on display panel 2081, the display screen handling module detects this operation, and makes display panel 2081 to display screen 2-1-8 which is the operation screen to select the this destination from among the list of facilities, etc. recorded for instance as registered place in memory card 210. The operator can select the desired facility from among the facilities, etc. displayed on screen 2-1-7 by using cross key 2073 and decision button 2074. And, when the desired facility is selected, the display screen handling module sets this facility as the destination. After that, screen 2-1-6 is displayed on display panel 2081.

(C-3) Screen 2-1-9

When button F5 is operated with screen 2-1 displayed on display panel 2081, the display screen handling module detects this operation, and makes display panel 2081 to display screen 2-1-9 which is the operation screen to accept the input by the telephone number. The operator can input the telephone number by sequentially selecting numeral from among the dial numeral displayed on screen 2-1-7 by using cross key 2073 and decision button 2074. The display screen handling module sets the address of the telephone corresponding to this telephone number as the destination. After that, screen 2-1-6 is displayed on display panel 2081.

Figure 7:
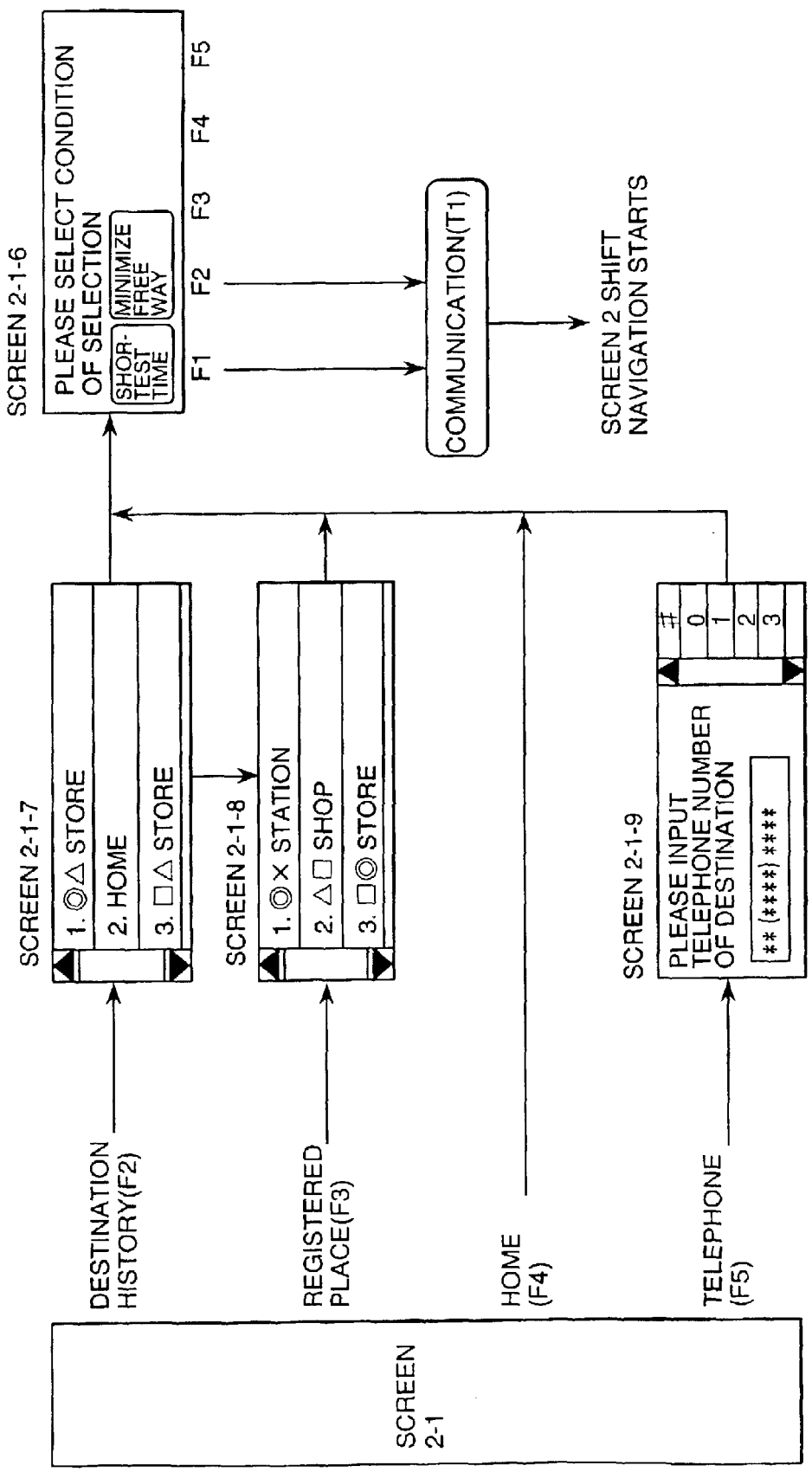
FIG. 7 is an illustration showing the screen change of operation screen displayed on display panel 2081 of FIG. 4.

In FIG. 7, when button F4 is operated with screen 2-1 displayed on display panel 2081, the display screen handling module sets, for instance, the address of his/her own house recorded in memory card 210 as the destination. After that, screen 2-1-6 is displayed on display panel 2081. Here, screen 2-1-6 is the same as screen 2-1-6 of FIG. 6.

Next, the operation when buttons F1–F3 are operated with screen 4 displayed will be explained with reference to FIG. 8.

(D-1) Screen 4-1

When button F1 is operated with screen displayed on display panel 2081, display screen handling module detects this operation, and makes display panel 2081 to display screen 4-1 which is the operation screen to select the type of facilities to which the icon is displayed when the map is displayed. The operator can select the desired type from among the type of facilities being displayed on screen 4-1(the plural types can be selected) by using cross key 2073 and decision button 20. The selected type is registered on memory card 210. The navigation module examines the facility type of the icon display registered on memory card 210, and displays the facility type set so as to display the icon on the map.

(D-2) Screen 4-2

When button F3 is operated with screen 4 displayed on display panel 2081, display screen handling module detects this operation, and makes display panel 2081 to display screen 4-2 which is the operation screen to register member information. The operator can input the member information by sequentially selecting the characters displayed on screen 4-2 by using cross key 2073 and decision button 2074. The member registration module registers this member information on memory card 210 as member data 2102.

Figure 8:
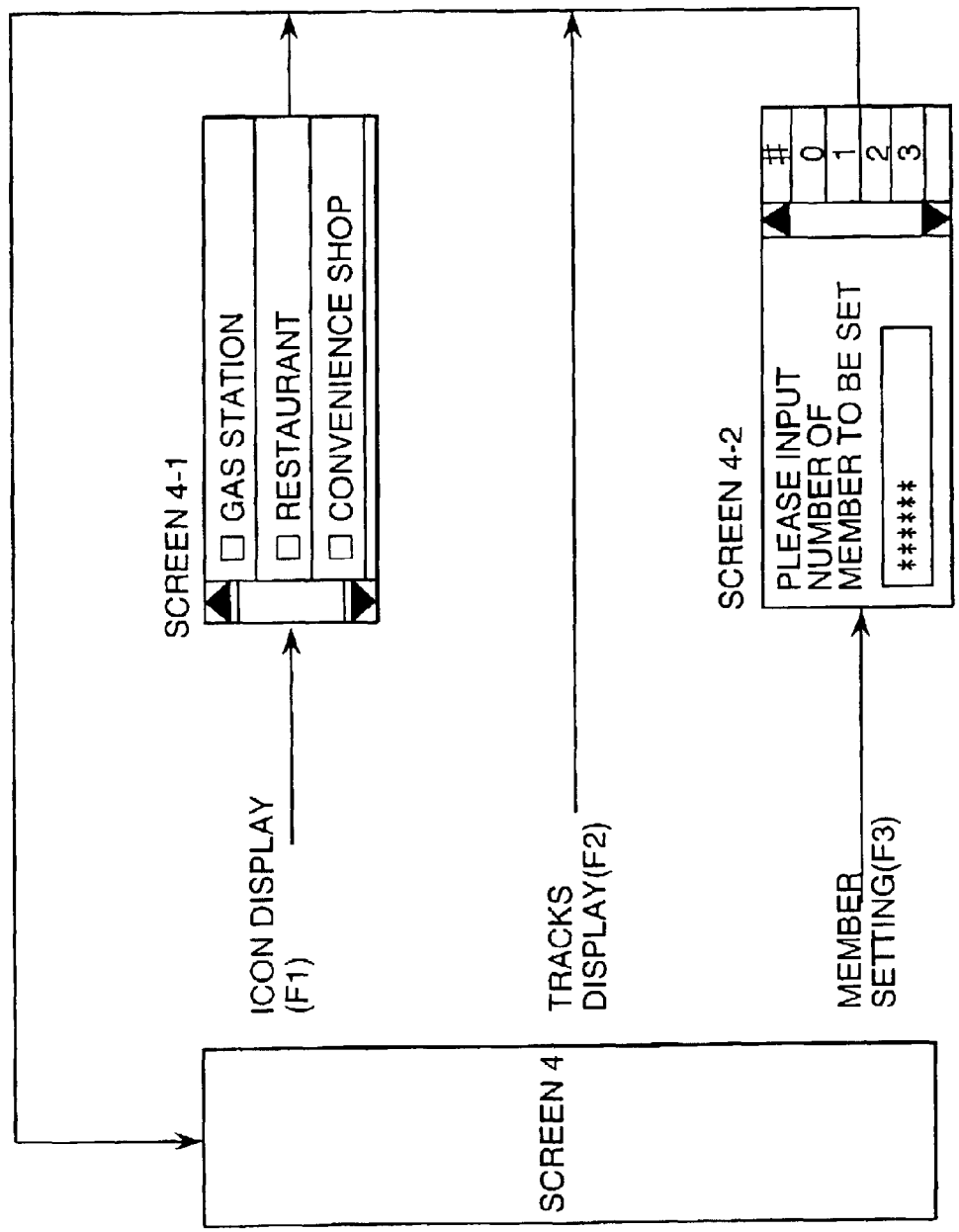
FIG. 8 is an illustration showing the screen change of operation screen displayed on display panel 2081 of FIG. 4.
Figure 9:
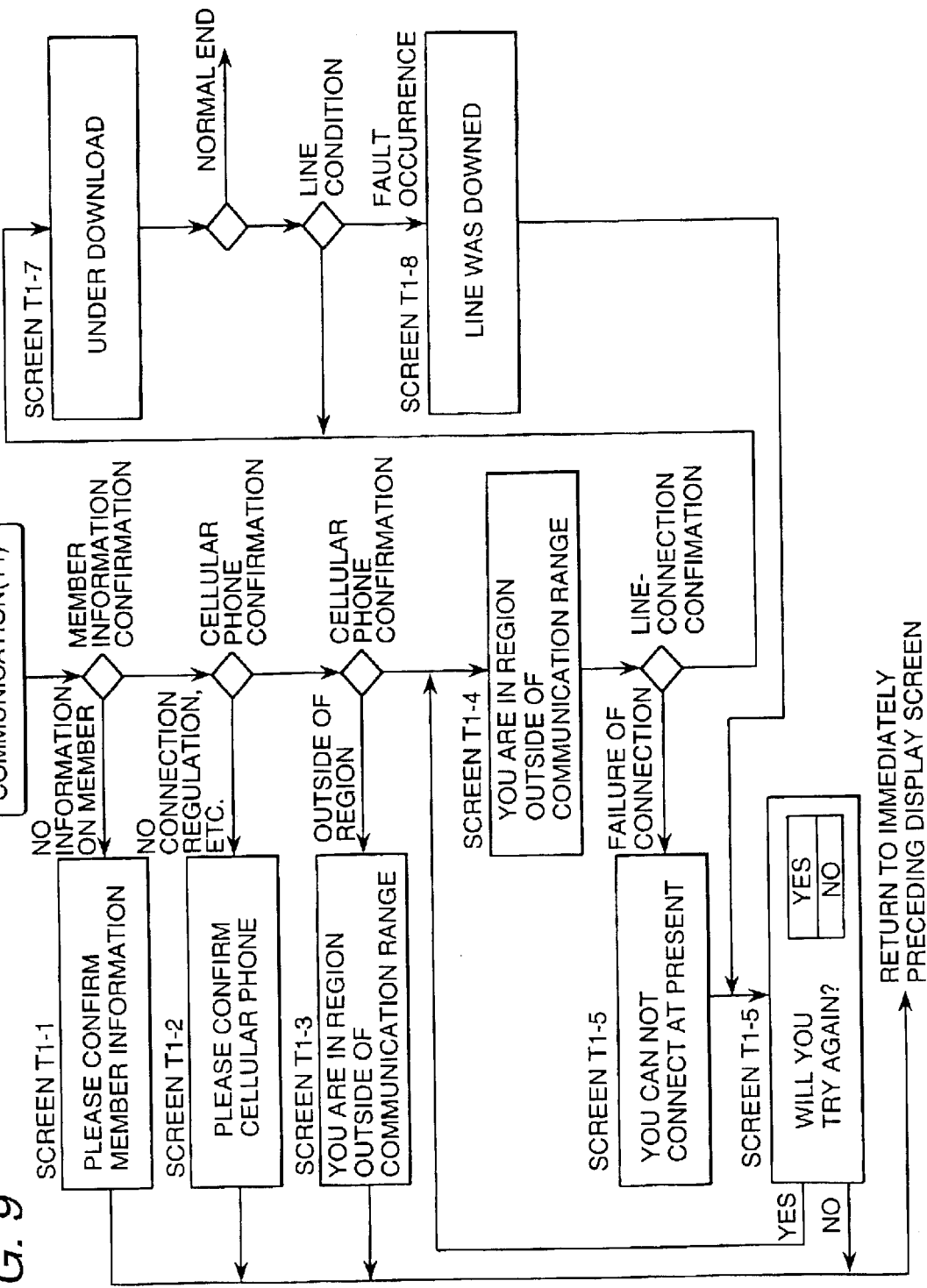
FIG. 9 is an illustration showing the screen change of operation screen displayed on display panel 2081 of FIG. 4.

When button F2 is operated with screen 4 displayed on display panel 2081 in FIG. 8, the display screen handling module turns on/off the flag indicative of the display of the track or non-display registered on memory card 210 for instance. The navigation module checks this flag registered on memory card 210, and decides whether to display track for the run of the car.

Next, the operation when information is downloaded from the information service center 10 will be explained by using FIG. 8.

(E-1) Screen T1-1

The communication control module confirms whether member data 2102 is registered on memory card 210. If not, it notifies the display screen handling module of that. When received, the display screen handling module makes display panel 2081 to display screen T1-1 including the message indicative of that. After that, after the predetermined time passes, the screen of display panel 2081 is returned to the screen displayed just before screen T1-1.

(E-2) Screen T1-2

The communication control module confirms the state of cellular phone 30. If cellular phone 30 is not connected, or if the dial is locked or the sending is restricted even when cellular phone 30 is connected, the communication control module notifies the display screen handling module of that. When received, the display screen handling module makes display panel 2081 to display screen T1-2 which includes the message indicative of that. After that, after the predetermined time passes, the screen of display panel 2081 is returned to the screen displayed immediately before beginning of the communication.

(E-3) Screen T1-3

The communication control module confirms the communication range of cellular phone 30. When the cellular phone is out of the communication range, the communication control module notifies the display screen handling module of that. When received, the display screen handling module makes display panel 2081 to display screen T1-3 which includes the message indicative of that. After that, after the predetermined time passes, the screen of display panel 2081 is returned to the screen displayed just before screen T1-3.

(E-4) Screen T1-4

The communication control module controls cellular phone 30 and calls the information service center 10 when it is confirmed to be able to call information service center 10 by the above-mentioned (E-1)–(E-3). And, the kind of the information which the operator wants to obtain, the condition (the content of the setting), and the member data are sent to information service center 10. Meanwhile, the display screen handling module makes display panel 2081 to display screen T1-4 which includes the message indicating that the connection is under negotiation.

(E-5) Screen T1-5

When the communication line between information service center 10 and this system can not be established due to the failure of the member authentication or the line congestion, etc., the communication control module notifies the display screen handling module of that. When received, the display screen handling module makes display panel 2081 to display screen T1-5 which includes the message indicative of that. After that, after the predetermined time passes, screen T1-6 is displayed on display panel 2081.

(E-6) Screen T1-6

The operator can select to retry through screen T1-6 by using cross key 2073 and decision button 207. When the retry is selected, the display screen handling module informs the communication control module of that. When received, the communication control module returns to the above-mentioned (E-4) and tries to call information service center 10. On the other hand, when the non-retry is selected, the display screen handling module returns the screen of display panel 2081 to the screen displayed immediately before beginning of the communication.

(E-7) Screen T1-7

When the communication line is established between information service center 10 and this system, the communication control module notifies the display screen handling module of that. When received, the display screen handling module makes display panel 2081 to display screen T1-7 which includes the message indicative of that. The communication control module sends the request of the reception of the information on the route data, the map data, and the traffic data, etc. by using the communication line established between information service center 10 and this system, and downloads the information from information service center 10. And, when downloading is completed, the communication line is cut off.

(E-8) Screen T1-8

When the trouble occurs in the communication line between information service center 10 and this system and the line is intercepted, the communication control module notifies the display screen handling module of that. When received, the display screen handling module makes display panel 2081 to display screen T1-8 which includes the message indicative of that. After that, after the predetermined time passes, screen T1-6 is displayed on display panel 2081.

Next, information service center 10 will be explained.

Figure 10:
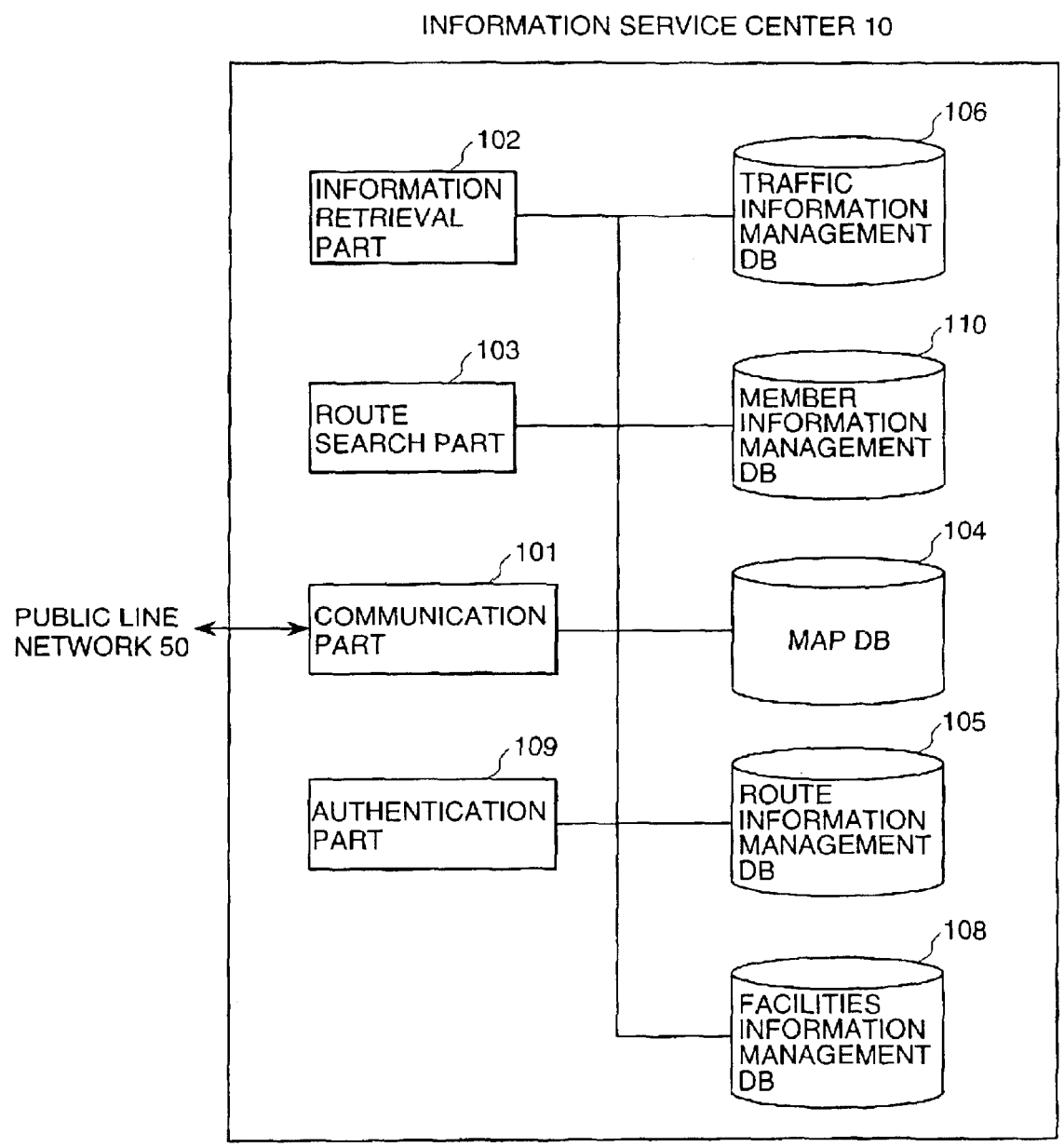
FIG. 10 is a function block diagram of information service center 10 shown in FIG. 1.

FIG. 10 is a function block diagram of information service center 10.

As shown in the figure, Information service center 10 includes communication part 101 which communicates with other party device through public line network 50, information retrieval part 102 which retrieves the information required from navigation device 20 through communication part 101, route search part 103 which searches the route according to the route search request received from navigation device 20 through communication part 101, map data base 104 in which the map data to use for the map display, the route display, and the route guidance in navigation device 20 is registered, route information data base 10 in which the road data used to search the route is registered, traffic information management database 106 in which the information on traffic trouble due to traffic jam and traffic accident, etc. in each road is registered, weather information management data base 107 in which the information on running attention such as rain, snows, and strong winds in each area is registered, facility information management data base 108 in which the information on facilities is registered, authentication part 109 which certificates the member information, and member information management data base 110 in which the member information on the user who can use information service center 10 is registered.

Figure 11:
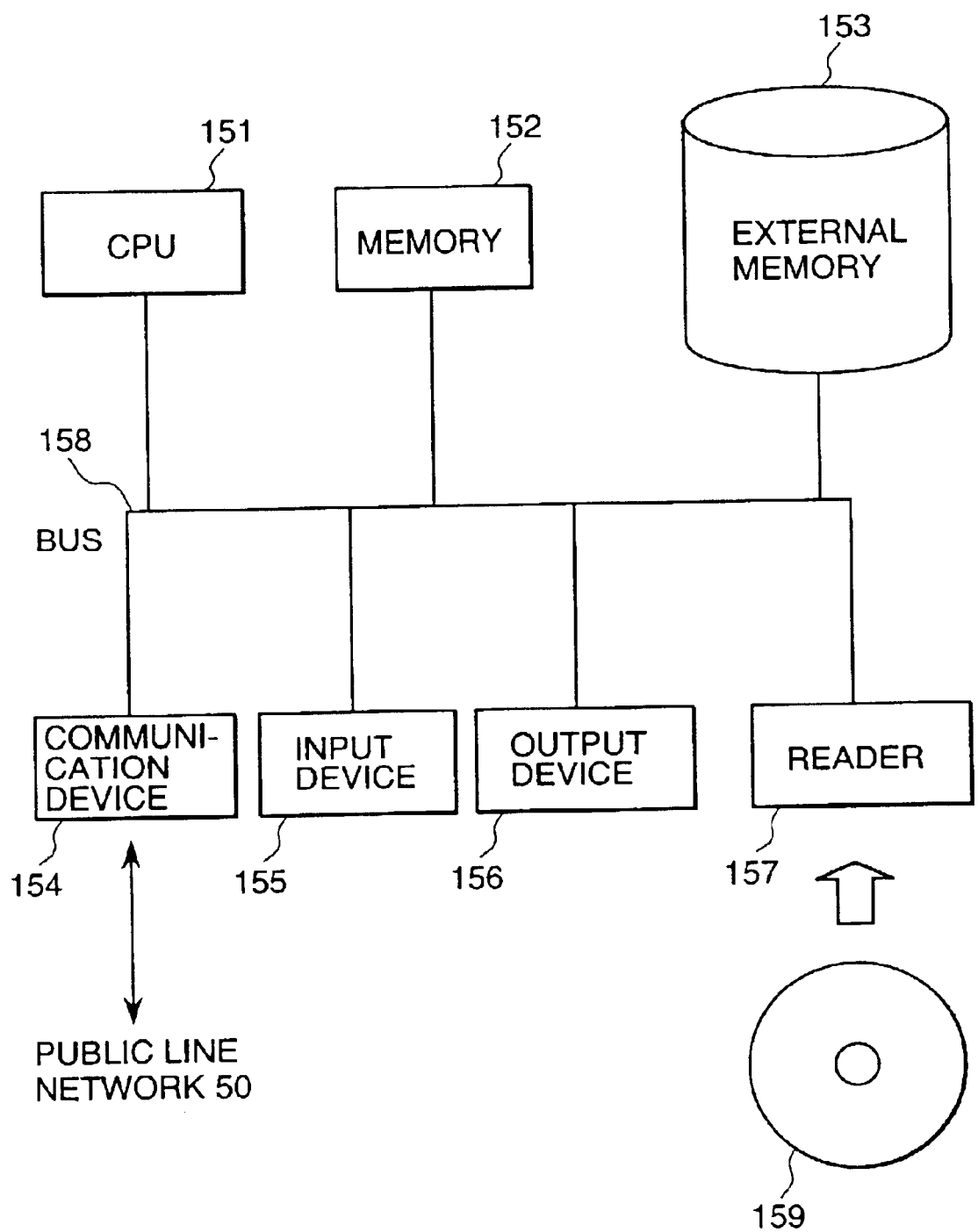
FIG. 11 is a view showing an example of the hardware configuration of information service center 10 shown in FIG. 10.

Information service center 10 which has the above-mentioned configuration can be constructed on the computer system which has the general configuration as shown in FIG. 11, comprising CPU 151, memory 152, external memory 153 such as a hard disk drive, reader 157 which reads data from storage medium 159 which has the portability such as a CD-ROM or a DVD-ROM, input device 155 such as a keyboard or a mouse, output device 156 such as a monitor, communication device 154 which communicates through public line network 50, and bus 158 which connects these device, or the network system constructed by connecting a plurality of these computer systems by using the network interface not shown.

The program for constructing the above-mentioned information service center 10 on such a computer system or network system can be taken from storage medium 159 into memory 152 through reader 157 or from external memory 153, and can be executed in CPU 151. Or, this program can be taken into memory 152 from public line network 50 through communication device 154 or from the network through the network interface not shown, and can be executed in CPU 151.

Next, the operation of information service center 10 which has the above-mentioned configuration will be explained.

FIG. 12 is a flow chart explaining the operation of information service center 10.

First of all, communication part 101 establishes the communication line between this navigation device 20 and the this communication part 101 when the message from navigation device 20 through public line network 50 is received, and receives the member information. Authentication part 109 certificates by examining whether this member information is registered in member information management data base 110. And, the processing (processing after S2702) advances next only when the authentication is established. The communication line is cut off (S2701) when the authentication is not established.

Next, communication part 101 receives the request from navigation device 20, and analyzes the content of the request (S2702, S2703). As a result, the request concerned is notified to route search part 103 if it is the route search request. The request concerned is notified to information retrieval part 102 if they are requests (either the map data request, the weather information request, the traffic information request or the facility information request) other than the route search.

Route search part 103 searches the recommended route between the departure place (present place) included in said route search request and the destination (destination set place) by using the Dijkstra method, etc. by using route information data base 105 when the route search request is received from the navigation device 20 through communication part 101 (S2704). Then, the data of the recommended route searched is sent to navigation device 20 which sends said route search request through communication part 101 (S2705).

When the map data request is received from the navigation device 20 through communication part 101, information retrieval part 102 reads the map data of the area which includes the area or the point included in the request concerned from the map data base 104 (S2706). And, the read map data is sent to navigation device 20 which sends said map data request through communication part 101 (S2707).

Further, when the facility information request is received from the navigation device 20 through communication part 101, information retrieval part 102 reads the facility information in the vicinity of the point (present place) included in the request concerned from facility information management data base 108 (S2708). The read facilities information is sent to navigation device 20 which sends said facility information request through communication part 101 (S2709).

Further, when the traffic information request is received from the navigation device 20 through communication part 101, information retrieval part 102 reads the traffic information in the vicinity of the point (present place) included in the request concerned from traffic in formation management database 106 (S2710). The traffic information read is sent to navigation device 20 which sends said traffic information request through communication part 101 (S2711).

One embodiment of the present invention has been explained above.

In navigation device 20 of this embodiment, the communication line has been established between information service center 10 and this system only when it is necessary to receive the information (for instance, map information used for the map display and route information used to guide the route) from the information service center 10, in order to perform the processing (for instance, the route guidance to the destination set by the user and map display in the neighborhood of the point set by the user) according to the setting given by the operator. And, when the reception of information ends, the communication line has been cut off. Therefore, it is possible to prevent the communication line from remaining being established with the communication not actually done. As a result, the establishment time of the communication line between information service centers 10 can be shortened.

According to the present invention, a plurality of operation screens are prepared hierarchically to receive the setting content from the operator. Thereby, the operation screen displayed in display panel 2081 is changed according to the content of the operation on screen switch buttons (F1 to F5) 2071 by the operator, the operation screen under the display, and the layered structure. Because each operation screen can be simply composed by adopting such configuration, the usability in the setting or the operation can be improved even when the display screen of display panel is made as a small, wide screen of about 4.2 inches for instance.

In navigation device 20 of this embodiment, item information 2075 allocated respectively of screen switch buttons (F1–F5) 2071 is displayed on display panel 2081 according to the way in which the correspondence relation between screen switch buttons 2071 and the item information is made to be understood. Therefore, it is possible to understand easily that which operation screen is obtained by operating which screen switch button 2071.

Further, in navigation device 20 of this embodiment, when the state where neither of screen switch buttons (F1–F5) 2071 is operated continues during the fixed time, item information 2075 is assumed to be non-display until some operations are newly done. Therefore, the usability can be improved even when the display screen of display panel is made as a small, wide screen of about 4.2 inches for instance.

The present invention is not limited to the above-mentioned embodiment. Further, it is possible to change variously within the range of the summary.

For instance, although navigation device 20 has cut off the communication line in the above-mentioned embodiment automatically after acquiring the information from the information service center 10, it is possible to display the message to confirm whether it is possible to cut off automatically in display panel 2081, and cut off automatically when the instruction given from the operator through operation button group 207 admits cutting off Next, the operation when the communication method of cellular phone 30 is a packet communication method will be explained. The communication method which cellular phone 30 adopts as mentioned above is judged by communication method judgment part 301 for cellular phone IF 30.

The communication charge is decided for the packet method in proportion to the data amount to communicate differently from the circuit switching method that the communication charge is decided depending on time when the line is connected. Therefore, the necessity for cutting off the line even if the communication ends disappears.

Even if the communication ends, communication control PG 2032 does not cut off the line when the communication method judgment part 301 for cellular phone IF 204 detects that the communication method of cellular phone 30 is the packet communication method. For instance, when button F3 is operated on screen 2-2 of FIG. 5 and the map data of the detailed map which tries to be displayed is not registered on memory card 210, the navigation module requests the reception of the detailed map data to the communication control module. When the communication line is cut off, the communication control module establishes the communication line between information service center 10 and this system, downloads the map data for a detailed map requested from the navigation module, and registers this on memory card 210. And, even when downloading ends, the communication line is not cut off for the packet communication method. Time (screen T1-4 of FIG. 8) to establish the connection of the communication line becomes unnecessary when the next communication begins by doing so, and the response quickens.

Further, although the present invention has been explained about an example of navigation device 20, it is not limited to this embodiment. The present invention can be applied also to the information terminal such as PDA (Personal Digital Assistance) other than navigation device 20.

What is claimed is:

1. A car navigation system which receives information from an information service device by using a communication line, comprising a communication part which communicates through said communication line, a display part, a plurality of screen switch buttons, and a processing part which accepts setting from an operator and performs the processing, wherein said processing part has;

a screen change processing means for allowing the operation screen displayed in said display part to change according to the content of the operation on said plural screen switch buttons by the operator, the operation screen under the display, and the layered structure of said plural operation screens, the operation screens to receive the setting from the operator being provided hierarchically; and a communication control processing means which establishes communication line between said information service device and said system by controlling said communication part when the information from said information service device is needed in order to process according to the setting given by the operator through each of a series of operation screens displayed in said display part, and cuts off said communication line after receiving said information.

2. The car navigation system according to claim 1, wherein said screen change processing means displays the confirmation screen in said display part to confirm whether said communication line is cut off before cutting off said communication line by said communication control processing means, and when the confirmation of the operator's intention by which said communication line is cut off is obtained through said confirmation screen, said communication control processing means cuts off said communication line.

3. The car navigation system according to claim 1, wherein said screen change processing means displays the state of establishment of said communication line by said communication control processing means in said display part.

4. The car navigation system according to claim 1, wherein when member information indicative of a qualification necessary to receive information concerned is not registered in said car navigation system even when it is necessary to receive information from said information service device, said screen change processing means does not perform the processing by which communication line is established between said information service device and this system.

5. The car navigation system according to claim 1, wherein said communication part communicates with said information service device by using a cellular phone.

6. The car navigation system according to claim 1, wherein said screen change processing means displays item information allocated to each of said plural screen switch button along with the operation screen concerned in said display part according to the layered structure of said plural operation screens and the operation screen under the display.

7. The car navigation system according to claim 6, wherein when the state that said plural screen switch buttons are not operated continues longer than the predetermined time, said screen change processing means does not display said item information until said car navigation system are operated by the operator afterwards.

8. A car navigation system which receives information from an information service device by using a communication line, comprising a communication part which communicates through said communication line, a display part, a plurality of screen switch buttons, and a processing part which accepts setting from an operator and performs;

wherein said processing part has;

a screen change processing means for allowing the operation screen displayed in said display part to change according to the content of the operation on said plural screen switch buttons by the operator, the operation screen under the display, and the layered structure of said plural operation screens, the operation screens to receive the setting from the operator being provided hierarchically; a communication method judgment means judges whether the communication method in said communication part is a circuit switching method or a packet method, a communication control processing means which establishes communication line between said information service device and said system by controlling said communication part when the information from said information service device is needed in order to process according to the setting given by the operator through each of a series of operation screens displayed in said display part, and cuts off said communication line when it is detected that said communication method is the circuit switching method after said information is received, the communication control processing means, or maintains the connection of said communication line when detected that it is the packet method.

9. The car navigation system according to claim 8, wherein when it is detected that said communication method is the circuit switching method, said screen change processing means displays the confirmation screen in said display part to confirm whether said communication line is cut off before cutting off said communication line by said communication control processing means, and when the confirmation of the operator's intention by which said communication line is cut off is obtained through said confirmation screen, said communication control processing means cuts off said communication line.

10. The car navigation system according to claim 8, wherein said screen change processing means displays the state of establishment of said communication line by said communication control processing means in said display part.

11. The car navigation system according to claim 8, wherein when member information indicative of a qualification necessary to receive information concerned is not registered in said car navigation system even when it is necessary to receive information from said information service device, said screen change processing means does not perform the processing by which the communication line is established between said information service device and this system.

12. The car navigation system according to claim 8, wherein said communication part communicates with said information service device by using a cellular phone.

13. The car navigation system according to claim 8, wherein said screen change processing means displays item information allocated to each of said plural screen switch button along with the operation screen concerned in said display part according to the layered structure of said plural operation screens and the operation screen under the display.

14. The car navigation system according to claim 13, wherein when the state that said plural screen switch buttons are not operated continues longer than the predetermined time, said screen change processing means does not display said item information until said car navigation system are operated by the operator afterwards.

* * * * *